United States Patent Office 3,711,381
Patented Jan. 16, 1973

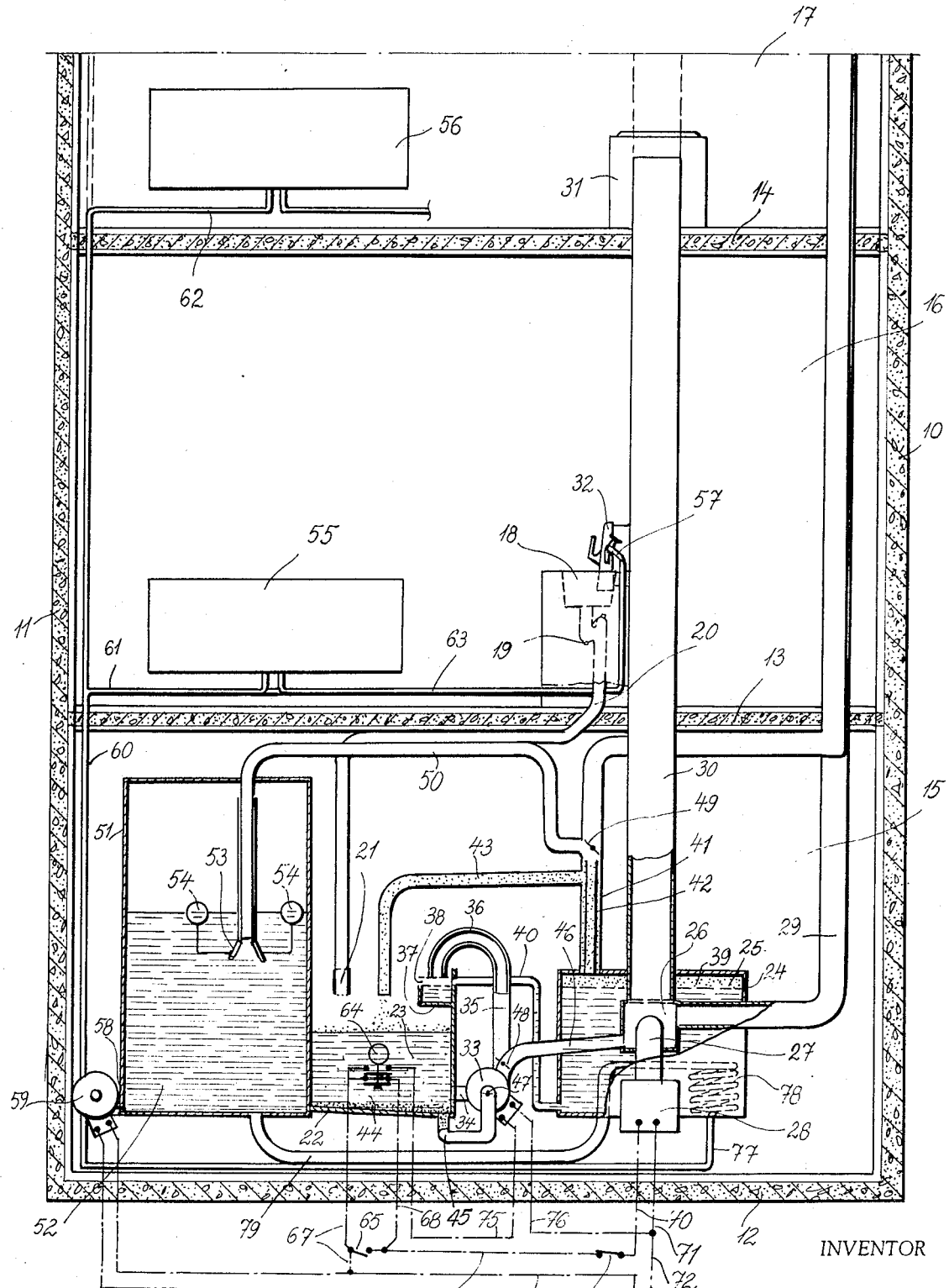

3,711,381
METHOD OF PURIFYING SEWAGE AND WASTE LIQUIDS AND A DECOCTING SYSTEM FOR CARRYING OUT THE METHOD
Göran Emil Lagström, Essingeringen 72C, Stockholm, Sweden
Filed Dec. 3, 1970, Ser. No. 94,862
Claims priority, application Sweden, Dec. 10, 1969, 17,073
Int. Cl. C02b 1/02; C02c 1/38
U.S. Cl. 203—20                  26 Claims

ABSTRACT OF THE DISCLOSURE

A method and system for purifying domestic effluent, wherein the effluent is cooked in a boiler to cause a foam in which the contaminants are collected. The foam and steam are removed together from the boiler and later separated, whereafter the foam is conducted to a sedimentation tank and the steam either released to atmosphere or used as a source of heat. The sludge obtained in the sedimentation tank as the foam breaks down is removed therefrom at suitable intervals and fed back to the boiler together with fresh effluent arriving from the various conveniences.

---

The present invention relates to a method of purifying sewage and domestic effluent.

The ever increasing consumption of water for cleaning purposes and the additions of chemical detergents thereto has created a serious problem with regard to the care and protection of the environment. This problem is of such magnitude that it has become necessary to introduce stringent regulations concerning the discharge of sewage and domestic effluent. Furthermore, the present day trend of rapidly expanding communities brings with it difficulties in increasing the capacity of existing sewage networks, sewage purification systems and rain water recovery works at the same rate of growth.

One object of the invention therefore is to provide a method for locally purifying sewage and domestic waste liquids in a manner whereby substantially one and the same quantity of water is constantly maintained in circulation and continuously purified, while recovering the heat obtained by the effluent during the process of purification.

In accordance herewith the invention is mainly characterized in that the effluent is boiled to produce a foam of the impurities contained therein, for example dirt, fats, detergents etc., whereafter the steam and foam are removed and the foam separated from the steam and the steam condensed.

The invention also relates to a decocting apparatus for purifying sewage and waste liquids for use with the method of the present invention.

The decocting apparatus according to the invention is mainly characterized by a boiler, the water chamber of which is provided with an effluent inlet located beneath the surface of the water and the boiler and from the steam dome of which extends an outlet conduit for removing steam and foam, the conduit being associated with a foam separating means which removes the foam from the steam and conducts said foam to a collecting station.

The invention will now be described in detail, with reference to an embodiment thereof diagrammatically illustrated in the accompanying drawing, further characteristic features of the invention being disclosed in conjunction therewith.

The drawing is a diagrammatic view, partly in section, of a preferred purifying system provided with a decocting apparatus for carrying out the method according to the invention.

The system is shown installed in a building, illustrated in vertical section, the outer walls of which are identified by the reference numerals 10 and 11 and the foundation of which is shown at 12. The building is divided into a number of floors or apartments by means of, inter alia, flooring or ceiling structures 13 and 14, the basement being shown at 15 and the first two apartments situated above the basement with the reference numerals 16 and 17.

Situated in the apartment 16 is a hand basin 18, which for the sake of simplicity represents the source of the effluent discharged, for example, from baths, showers, washing machines, dishwashing machines etc. Extending from the wash basin 18, via a conventional water trap 19, is a discharge pipe 20, which passes through the flooring structure 13 down to the basement floor 15. The discharge end 21 of the pipe 20 is located above a water tank 22 for effluent 23, which runs freely through the end 21 of the pipe 20. Located to one side of the tank 22 in the basement 15 is a boiler 24, which is filled with water to a level 25. The boiler is provided with a combustion chamber 26 having a heat source 27 which, for example, may be in the form of an oil burner, a gas burner or an electric heating coil. Conventional control equipment is provided in a box 28 for checking and controlling the heat source.

A waste-gas pipe 29 extends from the combustion chamber in a conventional manner, through the building and discharges into a chimney (not shown). In the exemplary embodiment, there is also connected to the combustion chamber 26 a chute 30 which extends vertically through the overlying apartments and is connected to a toilet 31 located in the compartment 17, effluent from toilet 31 being discharged into the combustion chamber 26 through the chute 30. Also connected to the chute 30 is a refuse disposal hatch, which is shown located in the apartment 16, whereby the boiler can also be utilized for burning sewage, waste liquids and garbage in parallel with the combustion or heating effected by means of the regular heat source 27.

The feature which in one respect distinguishes the system of the invention from known systems is that the boiler 24 is incorporated in a circuit for purifying sewage and other effluent and is charged with sewage water, which thus constitutes the boiler water. To enable the effluent to be fed to the boiler, there is arranged at the lower portion of the water tank 22 a pump 33, through the inlet 34 of which effluent is passed from the tank 22 into the pump. A riser 35 extends from the pump 33 and, via a pipe elbow 36, empties the effluent pumped thereto into a separate vessel 37 which is arranged at the top of the tank 22 and which is provided with a spillway 38 over which surplus water returns directly to the tank 22. The vessel 37 and its spillway 38 are arranged at a height at which the level of water therein, according to the law on communicating vessels, places the water level 25 in the boiler immediately beneath the top of the boiler so that a steam dome 39 is formed. Extending between the vessel 37 and the water chamber of the boiler is a connecting pipe 40, which passes into the boiler beneath the water level 25, preferably at the bottom of the boiler as shown in the figure.

The effluent charged to the boiler is heated to boiling, whereby impurities in the form of dirt, fats, fatty agents etc. are decocted in the form of foam to the surface 25 of the boiler water, the foam gradually substantially filling the steam dome 39. Extending from the upper portion of the dome 39 is a steam pipe 41, which passes upwardly through the apartments and suitably discharges freely to atmosphere above roof level. Centrally arranged in the lower portion of the steam pipe 41 is an inner pipe 42, while positioned between the inner pipe 42 and the outer steam pipe 41 at the bottom thereof is a concentric bottom, which blocks direct passage from the steam dome to the annular space between the steam pipe 41 and the inner pipe 42, the annular space thus forming a foam pocket. Steam and foam pass together up through the pipe 42 and the foam flows over the upper edge of the pipe, whereupon, owing to the fact that the dissolved particles of dirt give the foam a higher specific gravity than that of the steam, the foam falls down into the annular pocket around the pipe 42 while the steam flows freely upwardly. The foam is tapped from the pocket through a pipe 43 which extends to a position above the surface of the water in the water tank 22. The foam falls through the mouth of the pipe 43 and is collected in the tank 22, in which the foam disperses and the particles contained therein gradually settle to form a layer of sludge 44 on the bottom thereof. The exemplary system is provided with means for removing the sludge intermittently. Thus, the bottom of the tank 22 is inclined towards a sludge outlet 45 which is connected to the sewage pump 33. Passing directly from the pump 33 into the combustion chamber of the boiler 24 is a pipe 46, and shunt valves 47 and 48 are arranged in both the sludge outlet 45 and the pipe 46 respectively. By re-setting the shunt valves, it is thus possible to interrupt momentarily pumping of effluent up to the vessel 37 and instead pump the sedimented sludge 44 directly to the combustion chamber 26.

Subsequent to the foam having been separated from the steam in the steam pipe 41, it passes to a throttle 49 or some other appropriate valve means which can be adjusted to permit the steam to flow freely upwardly through the steam pipe, from which the steam flows freely into the atmosphere, where it condenses. This may seem a wasteful loss of heat energy, although on the other hand the condensation water has no deleterious effect on the surroundings, and this procedure must therefore be considered one of the solutions to the problem on which the invention is based.

It is, however, possible within the scope of the invention to use either totally or partially the heat content of the steam for useful purposes. For example, a portion of the steam may be passed directly to the surroundings, while the heat content of a remaining portion of the steam may be used within the heating system. During the summer period or in warm weather, it is suitable to pass all the steam to atmosphere, while under cold conditions it can be suitable to use within the heating system the heat content of all steam generated. To this end, the illustrated embodiment is provided on a level with the valve 49 with a branch pipe 50, through which all or a portion of the steam can be passed to the heating system, depending on the setting of valve 49. The pipe 50 passes into a condensation vessel 51, which contains a body of water 52, consisting of condensed steam. The steam pipe 50 is flexible and discharges into the condensed steam 52 via a funnel shaped mouth 53 located in the body of water and retained at a determined level beneath the surface of the water by means of floats 54. The level should lie under the level of water in the steam boiler, in order to avoid the occurrence of pressures above atmospheric therein, which would otherwise cause the condensed steam to be heated to an unnecessarily high temperature.

The body of water 52 comprising condensed steam represents a considerable source of heat, which can be utilized alternatively for central heating purposes and for preparing hot water or, as illustrated in the figure, for both purposes in combination. Thus, there is illustrated in each of the apartments 16 and 17 a radiator 55 and 56 respectively. Also shown in apartment 16 above the water basin is a hot water tap 57. A water outlet 58 at the bottom of the container 51 passes to a pump 59, which via a riser pipe 60 and branch pipes 61 and 62 feeds the hot water to the radiator 55 and the radiator 56 respectively. In the illustrated apartment 16 is shown a pipe 63 which extends from the radiator 55 and passes directly to the hot water tap 57. In this instance the same water is used to heat the room and as domestic hot water.

By means of the illustrated and described arrangement, it is therefore possible in cold weather to utilize all the steam generated in the boiler for heating purposes, a sterile and softened condensation water being obtained. The hot water drained through the tap 57 it can be returned at the same rate through the pipe 20 to the sewage tank 22, from where it is returned in the manner described to the boiler to be decocted therein. Thus, in this way it is possible to use continuously substantially one and the same quantity of water time after time without it being necessary to take in water from wells or communal water supply systems. Moreover, the invention affords the possibility of sterilizing the contaminants by decocting the same and in addition thereto also affords possibilities of removing the sludge sedimented in the waste water tank 22 and intermittently pump the sludge at appropriate times to the combustion chamber for direct combustion. The impurities contained in the sewage water will thus be totally destroyed without having a deleterious effect on the surroundings. Furthermore, if all the apparatus are installed in a common, well insulated room, the heat losses are maintained at a low level and good heat economy is obtained.

In order to make the described process fully automatic there is placed by way of example in the water tank 22 a 2-pole swimmer switch 64, which at a certain given lowest level short-circuits the regular operation thermostat 65 for the heat source 27 and thereby connects the heat source to the power network via lines 66, 67, 68, 69 and the normal maximum thermostat 74 simultaneously as it connects the pump 33 via the lines 66, 67, 75, 76, 72 and 73 for filling the vessel 37. If the maximum thermostat is set for temperatures above 100° C., the boiler decocts the mixture present therein. When the level in the water tank 22 drops to an impermissible level, the swimmer switch is disconnected, wherewith the heat source and the pump 33 are de-energized. Normally, if the tank for condensed steam has sufficient volume, the quantity of the condensation water on hand is sufficient to provide enough heat to heat the building, for example, during a long cold winter night, even though the boiler is not charged with effluent. For safeties sake, however, means can be provided for heating the condensation water in the container 51. This is effected as shown in the drawing by passing the condensation water, via a line 77, through a heat exchanger 78 located in the water chamber of the boiler and a line 79 to the pump 59. The pump 59 provides for circulation of the condensation water through the heat exchanger simultaneously as it feeds the radiators and hot water outlets. In the event that the heat content of the condensation water is used to such an extent that the temperature drops to a level below that to which the thermostat 65 is set, for example 80° C., the thermostat is activated and energizes the heat source of the boiler, irrespective of the position of the float in the water tank.

To prevent unnecessary heat from being passed through the heat exchanger 78 when the boiler is decocting, circulation can be closed, for example, in this circuit by means of a thermostat, which senses the temperature of the condensation water, and by means of a magnetic valve controlled by the thermostat and located in the line 77, the magnetic valve opening at a condensation water temperature of 50° C., for example.

The invention is not restricted to the illustrated and described embodiment thereof, but can be modified within the scope of the following claims.

What is claimed is:

1. A method for purifying liquids selected from domestic sewage, waste liquids and like effluents containing an amount of detergent or other foamable substance comprising feeding the liquid to be purified to a boiling station, boiling said liquid in the boiling station to produce steam and a foam which takes up impurities carried in the liquid, removing the steam and foam formed during the boiling operation from the boiling station, and passing the foam to a collecting station.

2. A method according to claim 1 further comprising removing the steam and foam together from the boiling station, separating the foam from the steam, passing the foam to a collecting station at which the foam is allowed to settle together with the impurities contained therein and releasing the steam to the atmosphere.

3. A method according to claim 1 further comprising initially removing the steam and foam together from the boiling station, separating the foam from the steam, passing the foam to a collecting station, condensing the steam and recovering at least a portion of the heat content of the steam.

4. A method according to claim 3 further comprising transferring the recovered portion of heat content of the steam to an enclosed area for the purpose of heating the atmosphere of said area.

5. A method according to claim 4 wherein the recovered portion of heat is transferred to a liquid and thereafter transferred from said liquid to the atmosphere of said enclosed area.

6. A method according to claim 5 wherein while said liquid contains the recovered portion of heat, the liquid is further heated.

7. A method according to claim 6 wherein the further heating is accomplished by passing said liquid in heat exchange relation with a hotter liquid.

8. A method according to claim 1 further comprising collecting the liquid to be purified in a first zone, pumping said liquid from said first zone to a second zone having a predetermined liquid level which determines the height of the water in the boiling station, and transferring said liquid to the boiling station from said second zone.

9. A method according to claim 8, characterized by passing the liquid to be purified into the boiling station beneath the level of the water therein.

10. A method according to claim 8 further comprising returning the foam to said first zone, causing said foam to progressively de-foam and the dirt and fats contained therein to settle to the bottom of the first zone, thereby forming a sludge, and intermittently removing the sludge.

11. A method according to claim 8 wherein said second zone has a predetermined height and a predetermined volume, said second zone located above said first zone and in fluid communication with said boiling station, said process further characterized in that the liquid to be purified is pumped from said first zone to said second zone and further wherein excess substance which is not transferred from said second zone to said boiling station is automatically returned to said first zone.

12. Apparatus for purifying domestic sewage, waste liquids and like effluents, comprising: an effluent supply means; a boiler having a heat source, said boiler connected to said effluent supply means and arranged to boil said effluent to produce from detergents contained therein a foam which takes up impurities carried in the effluents; means for removing the foam and the steam formed when boiling the effluent; separating means for separating the foam from the the steam; and means for conducting the foam to a collecting station.

13. Apparatus according to claim 12, further comprising means for conducting the steam separated from said foam to a place where it is condensed.

14. Apparatus according to claim 12, further comprising means for collecting effluent before it is passed to the boiler.

15. Apparatus according to claim 12, further comprising a first conduit separating means extending from the means for separating the foam from the steam and arranged to pass the foam to said means for collecting effluent.

16. Apparatus according to claim 14, characterized in that located in said means for collecting effluent is a separate effluent vessel provided with a spillway, said effluent vessel arranged to feed the boiler and to determine the level therein, said spillway adapted to empty surplus effluent back into the means for collecting effluent.

17. Apparatus according to claim 16, further comprising second conduit means for transferring effluent from said means for collecting effluent to the effluent vessel provided with a spillway, and a pump connected to said second conduit means for pumping liquid in said second conduit means, the capacity of said pump being equal to or greater than the capacity of the boiler to remove effluent by boiling.

18. Apparatus according to claim 12, further comprising a steam outlet extending from the means for separating the foam from the steam; a condenser in communication with said steam outlet; and means to connect said steam outlet with the atmosphere.

19. Apparatus according to claim 18, wherein the steam outlet is provided with a shunt-valve for passing steam either to said condensor or to the atmosphere or to both.

20. Apparatus according to claim 18, wherein the condensor is in heat exchange relation with a domestic heating device.

21. Apparatus according to claim 18, wherein the condensor comprises a tank, containing water, and means to discharge steam into the water beneath the water level.

22. Apparatus according to claim 21, wherein the means to discharge steam is supported by one or more floats.

23. Apparatus according to claim 17, further comprising means to activate and deactivate said pump and said heat source in response to the liquid level in the means for collecting effluent.

24. Apparatus according to claim 12, wherein the boiler contains a combustion chamber adapted to receive and destroy human and other waste material.

25. Apparatus according to claim 12, wherein said separating means for separating the foam from the steam comprises: a first separating conduit connected to the boiler so that foam and steam in the boiler pass therethrough against the force of gravity; a second separating conduit having a top which is in communication with the top of said first separating conduit so that foam separated from the steam falls through said second separating conduit by the force of gravity; and an exit means in communication with the tops of said first and second separating conduits so that steam removed from said foam rises through said exit means against the force of gravity.

26. Apparatus according to claim 12, wherein said separating means for separating the foam from the steam comprises: two concentric conduit means having an annular space therebetween, the outer concentric conduit means extending vertically higher than the inner conduit means; means to prevent the foam and steam from entering said annular space from the bottom of said concentric conduits; said means for conducting the foam to a remote station connected to said outer conduit vertically below the top of the inner concentric conduit.

References Cited

UNITED STATES PATENTS

| | | | |
|---|---|---|---|
| 3,080,302 | 3/1963 | Rogers et al. | 203—10 |
| Re. 26,891 | 5/1970 | Reid | 210—152 |
| 938,779 | 11/1909 | Morrison | 210—56 |
| 3,383,228 | 5/1968 | Rekate et al. | 203—11 X |
| 2,202,772 | 5/1940 | Durdin | 210—13 |
| 394,208 | 12/1888 | Peck | 210—181 X |

SAMIH N. ZAHARNA, Primary Examiner

T. G. WYSE, Assistant Examiner

U.S. Cl. X.R.

202—197; 203—40; 210—44, 56, 71, 152, 180